United States Patent [19]

Moore

[11] 4,345,512

[45] Aug. 24, 1982

[54] CONTAINER FOR MAKING A TEA BEVERAGE

[76] Inventor: Richard C. Moore, 2423 N. Humboldt, Portland, Oreg. 97217

[21] Appl. No.: 200,157

[22] Filed: Oct. 24, 1980

[51] Int. Cl.³ ............................................. A47J 31/18
[52] U.S. Cl. ...................................... 99/323; 206/0.5; 219/10.55 E
[58] Field of Search .................. 99/323, 316, 317, 318, 99/319, 320, 295; 426/77; 206/0.5; 210/282; 219/10.55 E

[56] References Cited

U.S. PATENT DOCUMENTS

| | | | |
|---|---|---|---|
| 1,313,582 | 8/1919 | Cowan | 99/323 |
| 1,601,671 | 9/1926 | Bonell | 99/323 |
| 2,391,397 | 12/1945 | Dever | 99/320 |
| 2,731,908 | 1/1956 | Morena | 99/323 |
| 3,348,469 | 10/1967 | Kasakoff | 99/320 |

FOREIGN PATENT DOCUMENTS 480596 2/1938 United Kingdom .................. 99/323

*Primary Examiner*—Robert W. Jenkins
*Attorney, Agent, or Firm*—Eugene M. Eckelman

[57] ABSTRACT

A hollow body portion is formed of upper and lower sections releasably connected together and constructed of microwave transparent material. The lower section is arranged to receive tea leaves and has apertures to admit water for steeping the tea leaves. The upper body section has a vented compartment defined by imperforate wall portions to provide buoyant support of the container. The container has a top finger grip tab and also has a bottom flat base for upright support on a counter surface.

3 Claims, 3 Drawing Figures

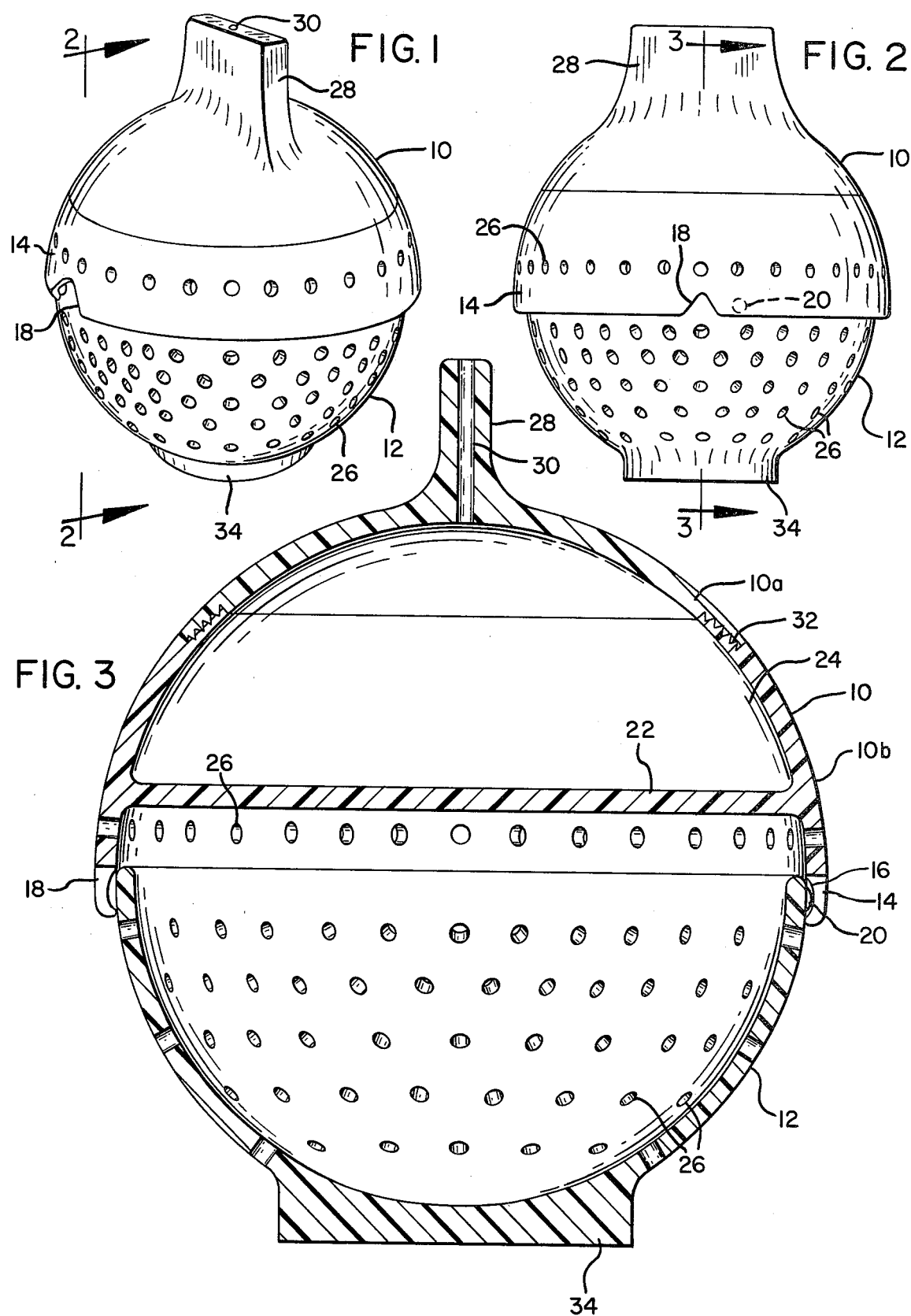

CONTAINER FOR MAKING A TEA BEVERAGE

BACKGROUND OF THE INVENTION

This invention relates to new and useful improvements in containers for making a tea beverage.

It is commonplace to use a metal tea ball for making tea, such tea ball comprising a container having releasable sections for inserting and removing tea leaves therein and also having a chain or drop line by means of which the ball can be inserted and removed in a container and worked up and down if necessary to extract flavor from the tea leaves. The ball has a plurality of apertures therearound and sinks in the supporting vessel to admit water for steeping the tea leaves and for discharging the flavored water.

SUMMARY OF THE INVENTION

According to the present invention and forming a primary objective thereof, a container for making a tea beverage is provided which amounts to novel improvements over the conventional tea ball.

More particular objects of the present invention are to provide a container of the type described having a structural arrangement which makes it buoyant so that it will float on the surface of water, thus eliminating the necessity of using a drop line and in general making the ball easy to insert and remove from a vessel. Another object of the invention is to provide a container of the type described which is useful in combination with microwave ovens.

In carrying out the present invention, the container employs a body portion formed of upper and lower sections releasably connected together for insertion and removal of tea leaves. Important to the invention, the upper section includes a compartment which provides buoyancy for the container. The sections below such compartment have a plurality of apertures that admit water for steeping the tea leaves. The upper section has a top projection providing a finger grip for handling the container and the lower section has a flat base portion for supporting the container upright on a counter surface. The top projection has a venting port to its buoyancy compartment, and the upper section has a removable cover to provide interior cleaning.

The invention will be better understood and additional objects and advantages will become apparent from the following description taken in connection with the accompanying drawings.

BRIEF DESCRIPTION OF THE DRAWINGS

FIG. 1 is a perspective view of a container embodying features of the present invention;

FIG. 2 is a side elevational view of the container but taken on line 2—2 of FIG. 1; and FIG. 3 is an enlarged sectional view taken on the line 3—3 of FIG. 2.

DETAILED DESCRIPTION OF A PREFERRED EMBODIMENT

With particular reference to the drawings, the present container comprises an upper section 10 and a lower section 12. These sections have a releasable connection for the insertion and removal of tea leaves into the container. The releasable connection comprises a lower flange extension 14 on the bottom edge of the upper section 10 which overlaps an upper portion of the lower section 12. This extension is feathered to a thin bottom end for a reason to be described hereinafter. Such lower extension has a concaved or cupped inner surface 16 and at least one, preferably two or more, vertical catch receiving notches 18. Lower section 12 has rounded catch projections 20 selectively located and matched in number with the vertical notches 18 such that a releasable connection is provided between the two sections 10 and 12 by vertually aligning the catch portions 18 and 20 and then turning the two sections a slight amount relative to each other to move the projections 20 into the concaved area 16. Separation of the sections 10 and 12 is accomplished by re-aligning the two catch portions by reverse turning of the two sections and then opening the container.

Upper section 10 has an inner wall 22 disposed above the bottom edge thereof to form an upper compartment 24, and the sections 10 and 12 have a plurality of apertures 26 below the wall 22 through which water can flow for steeping tea leaves in the lower portion of the container. Upper section 10 has a top projection 28 flattened on two sides to form a finger grip. The device can thus be readily handled by two fingers. Projection 28 has a venting port 30 therethrough venting the compartment 24 to atmosphere. Upper section 10 is constructed of two parts 10a and 10b releasably connected together for cleaning the interior of the compartment. Such connection may comprise a threaded connection 32. Wall 22 and lower defining portions of compartment 24 are imperforate. The section 12 is generally convex on its outer surface but has a flat bottom base 34 by means of which the device will support itself upright on a counter surface. The convex shape facilitates floating of the container in an upright position.

The two sections 10 and 12 are formed of a resinous, microwave transparent plastic material. Such a construction has a first advantage in that the present device can be used in a microwave oven and secondly the specific gravity of a suitable plastic material can contribute to buoyancy.

In use, tea leaves are placed in the bottom section 12 and the upper section 10 mounted thereon and locked in place by a short turning movement relative to the bottom section for engaging projections 20 behind flange extension 14. The container can then be inserted in a vessel for heating. Because of the imperforate lower portion of compartment 24 the container has buoyancy and floats on the surface of the water with the lower section 12 immersed in the water. As the water in the vessel is heated, the agitation resulting from steam on the surface and/or rising bubbles of the boiling water causes the container to move and bob and provide a fast mixing of the water with the tea leaves and fast steeping and extraction of flavor. Excess pressure in compartment 24 vents through port 30. The device is particularly usable with microwave ovens since the plastic is not heated by the energizing waves and thus it can be readily handled by the fingers. Since the container remains relatively cool and also since it floats and accomplishes its own agitation, a drop line is not necessary. By the particular design of the invention, a person can make a single cup of tea or a greater amount as well, and such can be accomplished in a very short time in a microwave oven.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A container for mixing a tea beverage in a supporting vessel comprising
   (a) a hollow body portion formed of upper and lower sections,
   (b) said body portion being constructed of microwave transparent material,
   (c) connecting means releasably connecting said upper and lower sections together,
   (d) said lower body section having an outer surface of convex shape and being arranged to receive tea leaves,
   (e) perforations in said lower body section of a size which confine tea leaves but which admit water for steeping the tea leaves and to discharge flavored water,
   (f) said upper body section having a compartment defined by imperforate wall means comprising a bottom wall portion and upper enclosing top and side wall portions,
   (g) said compartment providing buoyant support of the container whereby in making a tea beverage said container floats on the water to be flavored with at least a portion of said lower section below the surface for steeping the leaves and flavoring the water circulating through said container,
   (h) and venting means in an upper portion of said upper section leading from said compartment to atmosphere to relieve expanding gases in said compartment.

2. The container of claim 1 including a finger grip tab on the top of said upper body section, said venting means passing through said finger grip tab.

3. The container of claim 1 wherein said upper section comprises a pair of releasable parts to provide cleaning access to said compartment.

* * * * *